(12) United States Patent
Zhang et al.

(10) Patent No.: US 8,970,078 B2
(45) Date of Patent: Mar. 3, 2015

(54) ELECTRIC MOTOR

(75) Inventors: Hong Wei Zhang, Shenzhen (CN); Biao Yu, Shenzhen (CN)

(73) Assignee: Johnson Electric S.A., Murten (CH)

( * ) Notice: Subject to any disclaimer, the term of this patent is extended or adjusted under 35 U.S.C. 154(b) by 472 days.

(21) Appl. No.: 13/343,199

(22) Filed: Jan. 4, 2012

(65) Prior Publication Data

US 2012/0175980 A1 Jul. 12, 2012

(30) Foreign Application Priority Data

Jan. 7, 2011 (CN) .......................... 2011 1 0004071

(51) Int. Cl.
*H02K 11/00* (2006.01)
*H02K 5/14* (2006.01)
*H02K 5/22* (2006.01)

(52) U.S. Cl.
CPC ............ *H02K 5/145* (2013.01); *H02K 11/0021* (2013.01); *H02K 5/225* (2013.01); *H02K 2203/03* (2013.01)
USPC ............ 310/68 B; 310/68 R; 310/71; 310/89; 310/239

(58) Field of Classification Search
CPC ....... H02K 5/143; H02K 5/145; H02K 5/146; H02K 5/148; H02K 11/0021; H02K 11/026
USPC .................................................. 310/238–247
See application file for complete search history.

(56) References Cited

U.S. PATENT DOCUMENTS

| | | | |
|---|---|---|---|
| 6,127,752 A | 10/2000 | Wiesler | |
| 6,268,669 B1 * | 7/2001 | Wakao et al. | ............... 310/67 R |
| 7,417,352 B2 * | 8/2008 | Hirano et al. | ................. 310/239 |
| 2002/0030414 A1 * | 3/2002 | Mizutani et al. | ................ 310/51 |
| 2010/0181853 A1 | 7/2010 | Wong et al. | |

FOREIGN PATENT DOCUMENTS

JP 2009124797 A * 6/2009

* cited by examiner

*Primary Examiner* — Burton Mullins
*Assistant Examiner* — Eric Johnson
(74) *Attorney, Agent, or Firm* — Muncy, Geissler, Olds & Lowe, P.C.

(57) ABSTRACT

An electric motor includes a stator, a rotor and an end cap. The stator includes a housing and magnets attached to an inner surface of the housing. The housing has an open end closed by the end cap. The rotor includes a shaft, an armature and a commutator fixed to the shaft. The end cap includes a cover case, a support plate integrally formed in the cover case, brushes, a bearing and a printed circuit board mounted in the cover case. The support plate divides the interior space of the cover case into a first cavity and a second cavity. The brushes are mounted in the first cavity, the bearing is mounted on the support plate, and the printed circuit board is mounted in the second cavity.

8 Claims, 6 Drawing Sheets

ELECTRIC MOTOR

CROSS REFERENCE TO RELATED APPLICATIONS

This non-provisional patent application claims priority under 35 U.S.C. §119(a) from Patent Application No. 201110004071.5 filed in The People's Republic of China on Jan. 7, 2011.

FIELD OF THE INVENTION

This invention relates to an electric motor having an end cap.

BACKGROUND OF THE INVENTION

An electric motor typically includes a stator and a rotor. The stator has a hollow housing with an open end, and an end cap covers the open end of the housing so as to seal the housing. The rotor is received in the housing with a shaft thereof extending out of the end cap. The end cap includes multiple components mounted thereon, such as a printed circuit board (PCB) with lots of electronic components mounted thereon, brushes for supplying power to the rotor, and a bearing for rotatably supporting the shaft of the rotor. As a result, there is no space left for mounting other components such as electromagnetic compatibility (EMC) components.

One solution disclosed by US Patent Application publication number US2010-0181853, has an extra protection cap specially added for mounting the PCB. As the PCB is mounted on the protection cap, there is enough space left in the end cap for mounting other components, such as electromagnetic compatibility (EMC) components. However, the extra protection cap makes the motor complex, and the assembly of the motor is time-consuming.

Therefore, there is a desire for an improved motor that can overcome the above described shortcomings.

SUMMARY OF THE INVENTION

Accordingly, in one aspect thereof, the present invention provides an electric motor comprising: a stator comprising a housing and a plurality of magnets attached to an inner surface of the housing, the housing having an open end thereof; a rotor comprising a shaft, an armature, and a commutator fixed to the shaft, the rotor received in the housing with an outer periphery of the armature facing the magnets of the stator; and an end cap covering the open end of the housing of the stator, the end cap comprising: a cover case; a support plate integrally formed in the cover case, the support plate dividing an interior space of the cover case into a first cavity facing the housing, and a second cavity remote from the housing; a plurality of brushes mounted in the first cavity of the cover case; a bearing mounted on the support plate; and a printed circuit board mounted in the second cavity of the cover case.

Preferably, the motor further comprising a connector integrally formed with the cover case, the connector comprising a plurality of terminals respectively electrically connected with the printed circuit board and the brushes.

Preferably, the connector adjoins a radial outer periphery of the cover case, and the terminals extend into the cover case.

Preferably, the terminals are respectively soldered to contacts of the printed circuit board.

Preferably, the printed circuit board is arranged parallel to the axial direction of the motor.

Preferably, the motor further comprising a PTC mounted in the first cavity of the cover case, wherein the plurality of brushes comprises a first brush and a second brush, and the PTC is electrically connected in series with the first brush.

Preferably, the motor further comprising a first choke electrically connected with the first brush, and a second choke electrically connected with the second brush, the first and second chokes being disposed within the first cavity of the cover case.

Preferably, the motor further comprising a capacitor mounted in the first cavity of the cover case, wherein the capacitor is electrically connected between the first brush and the second brush.

Preferably, the motor further comprising a Hall sensor mounted on the printed circuit board, wherein the rotor further comprises a ring magnet mounted on the shaft and located in the second cavity of the cover case, and the ring magnet combined with the Hall sensor is used to detect a rotational speed of the rotor.

Preferably, the motor further comprising a grounding terminal, one end of the grounding terminal extending into the connector and electrically connected with one of the plurality of terminals, and the other end of the grounding terminal is sandwiched between the cover case and the housing and electrically connected to the housing.

Preferably, the motor further comprising a further printed circuit board and a grounding capacitor mounted on the further printed circuit board, the grounding capacitor connecting one of the terminals to the housing.

Preferably, the further printed circuit board is arranged substantially perpendicular to an axial direction of the motor.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
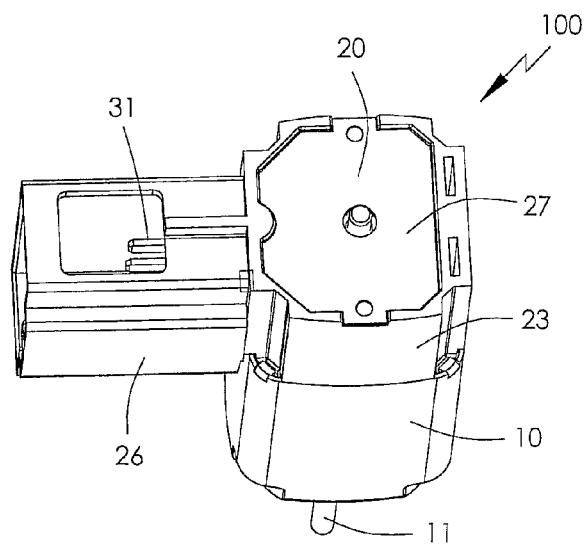
FIG. 1 is an assembled, isometric view of a motor according to a first embodiment of the present invention, showing an end cap assembled to a stator.
Figure 2:
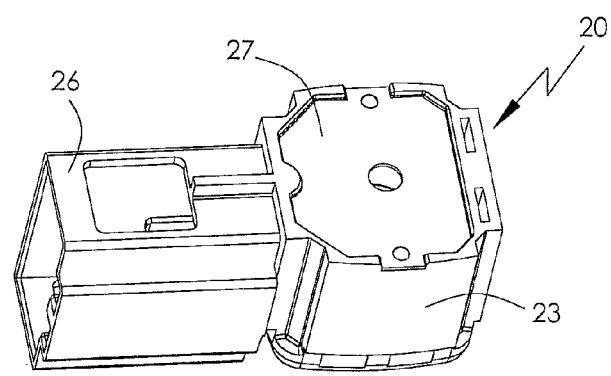
FIG. 2 is a partially exploded view of the motor of FIG. 1.
Figure 2:
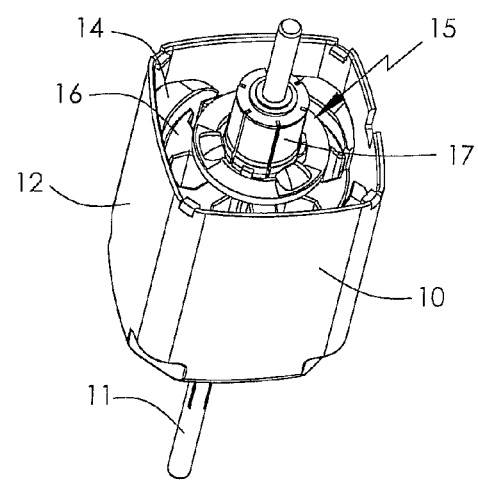

Referring to FIGS. 1 and 2, the motor 100 includes a stator 10, a rotor 15 received in the stator 10, and an end cap 20 connected to the stator 10. The stator 10 includes a housing 12 with an open end, a plurality of permanent magnets 14 attached to an inner surface of the housing 12. The rotor 15 includes a shaft 11, an armature 16 and a commutator 17 fixed to the shaft 11. The shaft 11 extends through the stator 10 for transmitting a torque of the rotor 15 when the rotor 15 rotates relative to the stator 10. The rotor 15 is received in the housing 12 with a radial outer periphery of the armature 16 facing the magnets 14. The end cap 20 covers the open end of the housing 12, when the stator 10, the rotor 15 and the end cap 20 are assembled together.

The end cap 20 includes a cover case 23 and a connector 26 integrally formed together, as a monolithic construction. More specifically, the cover case 23 and the connector 26 are formed as a single molding. The cover case 23 extends along an axial direction of the motor 100. The connector 26 adjoins a radial outer periphery of the cover case 23, and the connector 26 extends along a direction substantially perpendicular to the axial direction of the motor 100.

Figure 3:
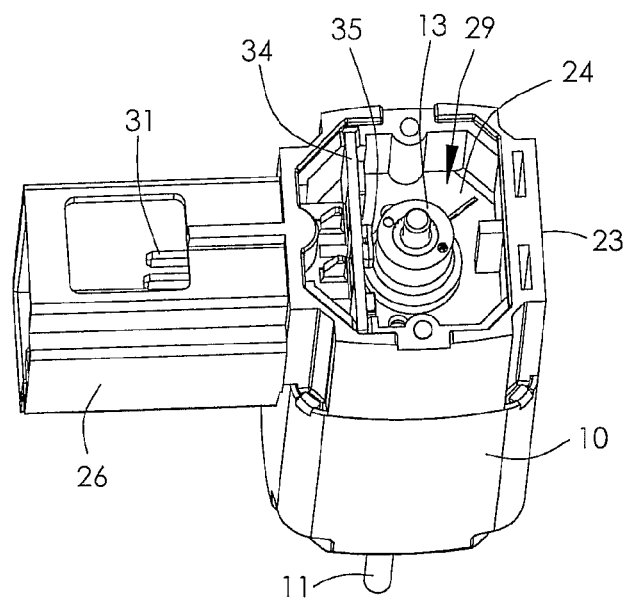
FIG. 3 is similar to FIG. 1, but with an end plate of the end cap removed to show an interior structure of the end cap.
Figure 4:
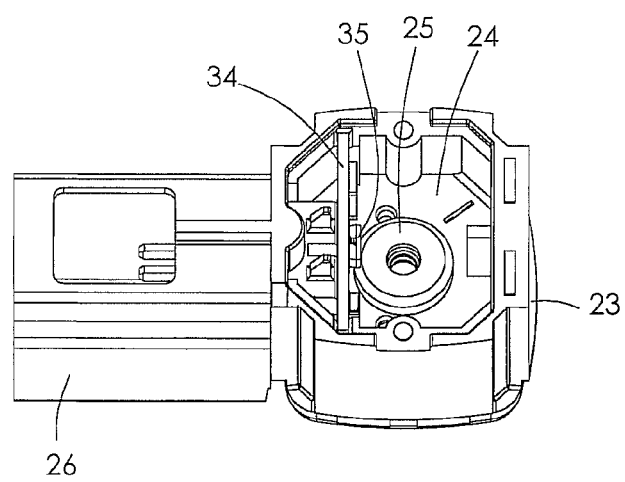
FIG. 4 shows only the end cap of FIG. 3, also with the end plate removed.
Figure 5:
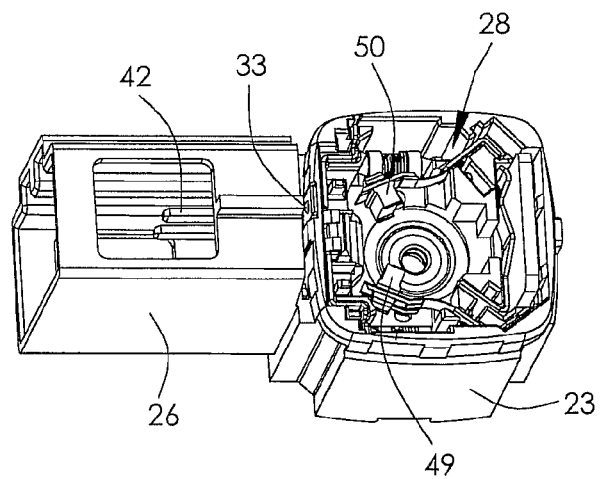
FIG. 5 shows the end cap of FIG. 4, viewed from below.
Figure 6:
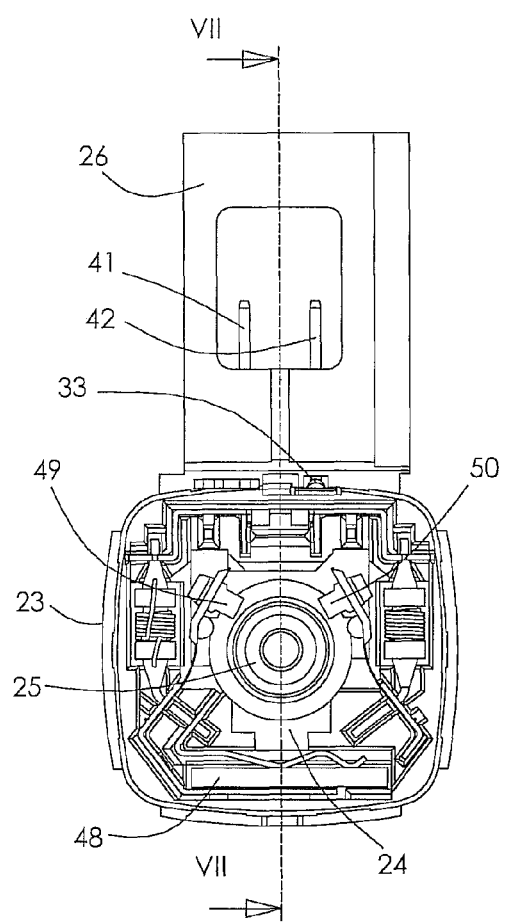
FIG. 6 is a plan view from below of the end cap of FIG. 4.
Figure 7:
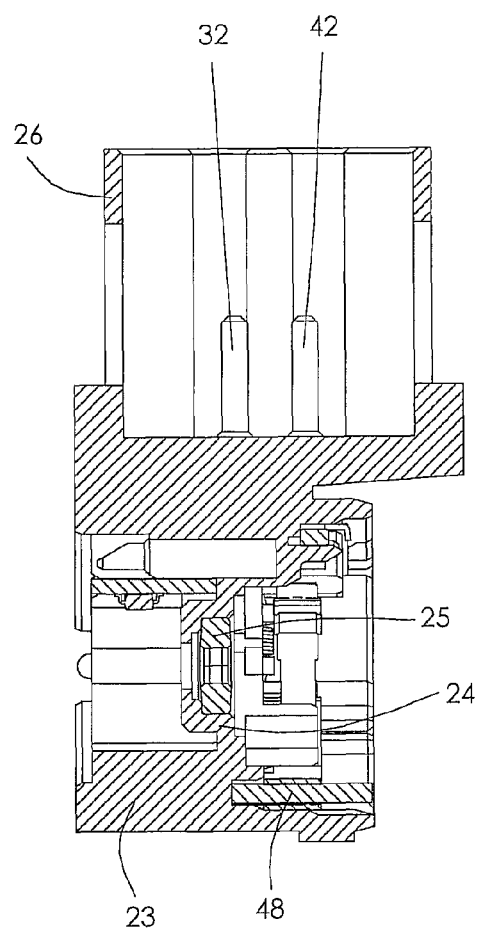
FIG. 7 is a cross section of the end cap of FIG. 6, taken along a line VII-VII thereof.

Referring also to FIGS. 3 to 5, the cover case 23 is in the form of a hollow cylinder with two axially open ends. One open end of the cover case 23 is connected to the open end of the housing 12 of the stator 10. The other open end of the cover case 23 is covered by an end plate 27. A support plate 24 is integrally formed in the cover case 23 and located at an axial middle of the cover case 23. More specifically, the support plate 24 and the cover case 23 are formed as a monolithic construction by a single molding. The support plate 24 is arranged perpendicular to an axial direction of the cover case 23, such that the support plate 24 divides an interior space of the cover case 23 into two cavities 28, 29 along the axial direction of the cover case 23. The two cavities 28, 29 are assigned as a first cavity 28 facing the stator 10, and a second cavity 29 located remote from the stator 10.

Brushes 49 and 50 are installed in the first cavity 28 of the cover case 23. The brushes 49 and 50 are arranged to slidably contact the commutator 17 to provide power to the rotor 15. In the present embodiment, the commutator 17 of the rotor is at least partially received in the first cavity 28 of the cover case 23 to ensure good contact between the brushes 49, 50 and the commutator 17. A printed circuit board (PCB) 34 with a Hall sensor 35 mounted thereon is installed in the second cavity 29 of the cover case 23. In this embodiment, the PCB 34 is received in a mounting groove of the cover case 23, and arranged parallel to the axial direction of the motor 100.

A bearing 25 is mounted to the support plate 24 to rotatably support the shaft 11. The shaft 11 of the rotor 15 extends through the first cavity 28, the bearing 25, and enters the second cavity 29. A ring magnet 13 is mounted on the shaft 11 of the rotor 15, and is located in the second cavity 29. When the shaft 11 rotates, the ring magnet 13 rotates with the shaft 11. The ring magnet 13 and the Hall sensor 35 are used to detect the rotational speed of the rotor 15.

Referring also to FIGS. 6 to 9, four terminals 31, 32, 41 and 42 are formed in the connector 26 by insertion molding. The terminals 31 and 32 extend in to the second cavity 29 of the cover case 23 and are electrically connected to the PCB 34, to supply power to the PCB 34 and to receive feedback signals from the Hall sensor 35. In this embodiment, terminals 31 and 32 are soldered to contacts 36 of the PCB 34.

Figure 9:
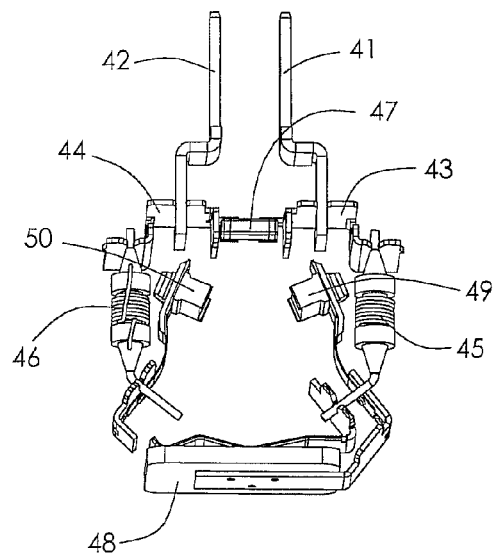
FIG. 9 is similar to FIG. 8, viewed from another aspect, and with the PCB and two terminals removed.

Referring to FIG. 9, terminals 41 and 42 extend in to the first cavity 28 of the cover case 23 and are electrically connected to the brushes 49 and 50, respectively, to supply power to the motor 100. A positive temperature coefficient thermistor (PTC) 48 is electrically connected in series between the terminal 41 and the brush 49 to protect the motor from overheating.

In the present embodiment, the end cap 20 further includes electromagnetic compatibility (EMC) components to improve the electromagnetic compatibility level of the motor 100. The EMC components includes a first choke 45, a second choke 46 and a capacitor 47. The capacitor 47 is electrically connected between the brushes 49 and 50. The terminal 41, a first conducting plate 43, the first choke 45, the PTC 48, and the brush 49 are electrically connected in series. Preferably, the connections between these components are achieved by pressure connections, also known as mechanical connections. The terminal 42, a second conducting plate 44, the second choke 46 and the brush 50 are electrically connected in series. Similarly, the connections between these components are preferably achieved by pressure connections, which make the preassembly of the end cap 20 simple thus reducing the cost of the motor 100.

Figure 8:
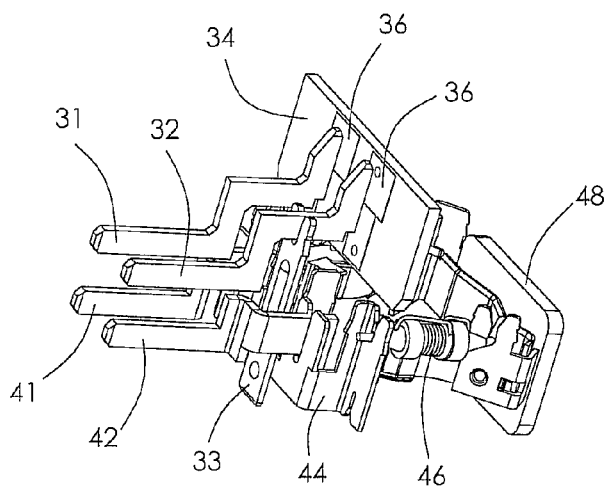
FIG. 8 shows the relationship between of terminals, a PCB, brushes, and an EMC component, all of which are installed in the end cap of FIG. 4.
Figure 10:
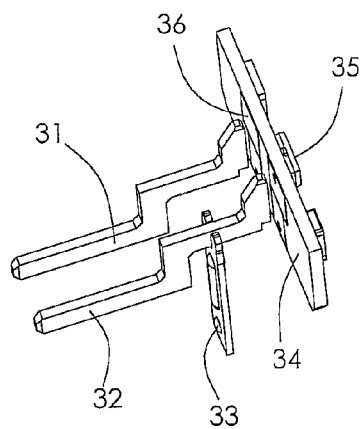
FIG. 10 shows the relationship between two of the terminals and the PCB of FIG. 8.

Referring to FIGS. 5, 8 and 10, the end cap 20 further includes a grounding terminal 33. One end of the grounding terminal 33 extends in to the connector 26 and electrically connects to the terminal 32. The other end of the grounding terminal 33 is sandwiched between the cover case 23 and the housing 12, and is electrically connected to the housing 12.

Figure 11:
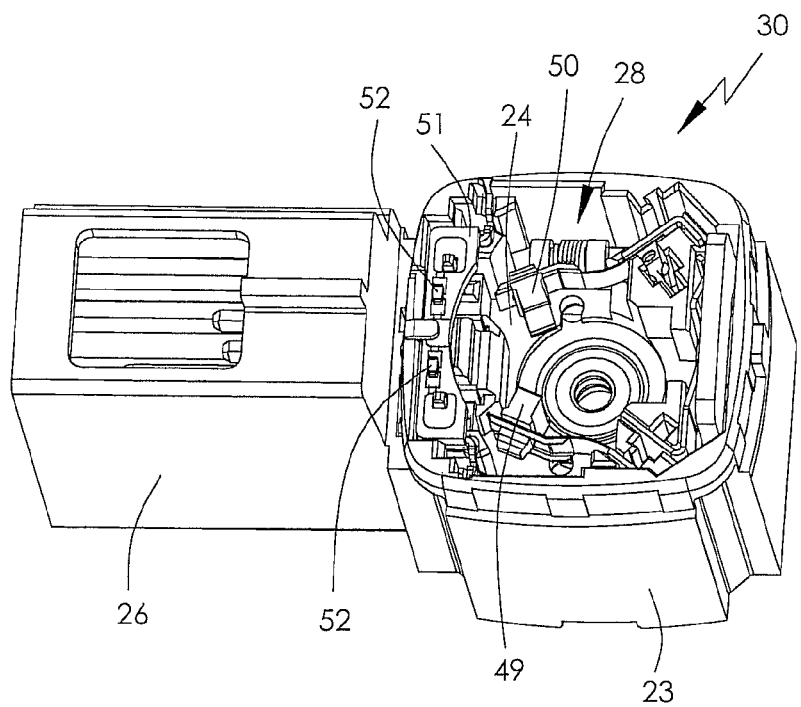
FIG. 11 shows an end cap of a motor according to a second embodiment, wherein the motor further includes an extra printed circuit board with grounding capacitors mounted thereon.
Figure 12:
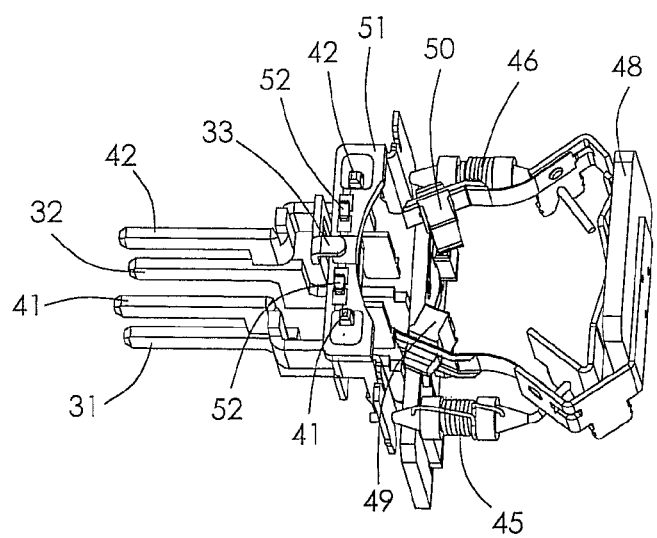
FIG. 12 shows the relationship between the terminals and grounding capacitors of the end cap of FIG. 11.

FIGS. 11 and 12 show an end cap 30 of a motor according to a second embodiment. The end cap 30 of this embodiment differs from the first embodiment only in that the end cap 30 includes a further circuit board 51 with two grounding capacitors 52 mounted thereon. Each of the grounding capacitors 52 electrically connects a respectively terminal 41 or 42 to the housing of the motor. The grounding capacitors 52 further improve the electromagnetic compatibility level of the motor. In this embodiment, the further circuit board 51 is mounted in the first cavity 28 of the end cap 50, and arranged substantially parallel to the support plate 24. In other words, the further circuit board 51 is arranged substantially perpendicular to the axial direction of the motor.

Figure 13:
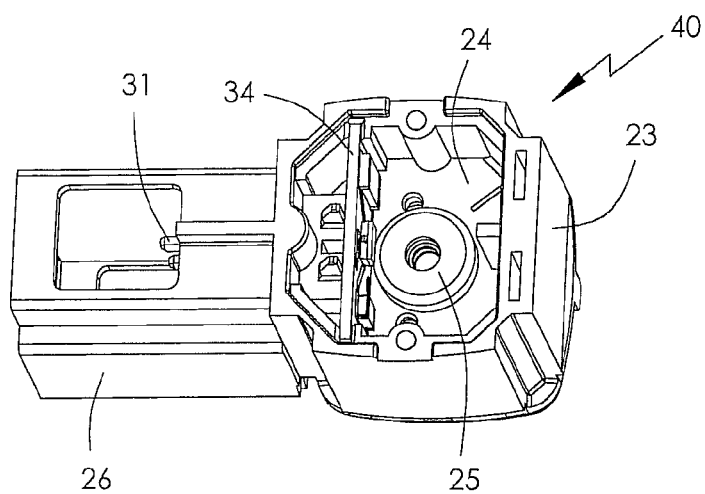
FIG. 13 shows an end cap of a motor according to a third embodiment, with an end plate thereof removed.
Figure 14:
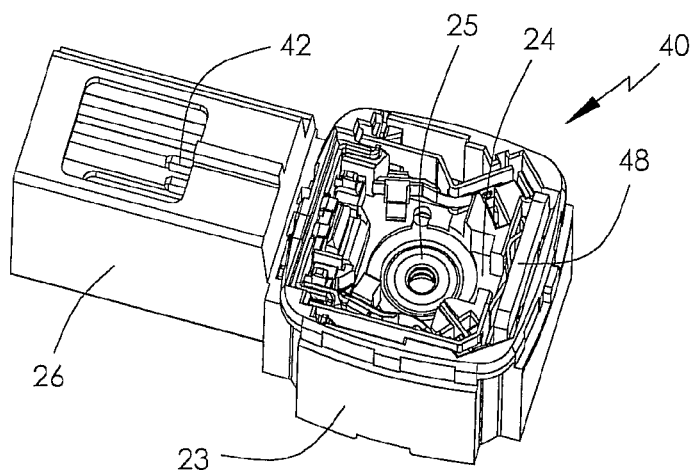
FIG. 14 shows the end cap of FIG. 13, viewed from below.
Figure 15:
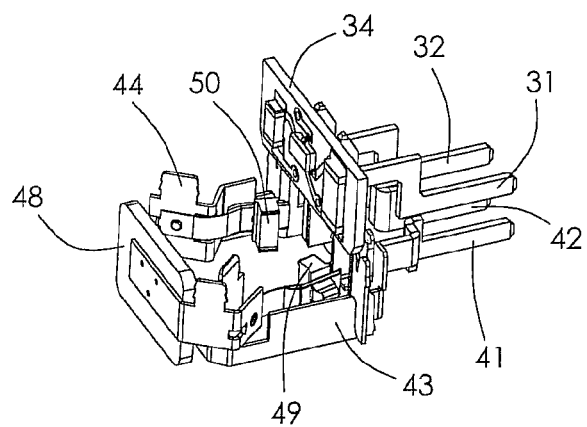
FIG. 15 shows the relationship between terminals and brushes of the end cap of FIG. 13.

FIGS. 13 to 15 show an end cap 40 of a motor according to a third embodiment. In this embodiment, the end cap 40 is simpler than the end cap 20 of the first embodiment as the EMC components have been omitted. In this embodiment, the first conducting plate 43 is directly connected to the PTC 48. The second conducting plate 44 is directly connected to the brush 50. In case of need, the first cavity 28 of the cover case 231 reserves space for EMC components.

Although the invention is described with reference to one or more preferred embodiments, it should be appreciated by those skilled in the art that various modifications are possible. Therefore, the scope of the invention is to be determined by reference to the claims that follow.

In the description and claims of the present application, each of the verbs "comprise", "include", "contain" and "have", and variations thereof, are used in an inclusive sense, to specify the presence of the stated item but not to exclude the presence of additional items.

The invention claimed is:

1. An electric motor comprising:
a stator comprising a housing and a plurality of magnets attached to an inner surface of the housing, the housing having an open end thereof;
a rotor comprising a shaft, an armature, a commutator fixed to the shaft, and a ring magnet mounted on the shaft, the rotor received in the housing with an outer periphery of the armature facing the magnets of the stator;
an end cap covering the open end of the housing of the stator, the end cap comprising:
 a cover case;
 a support plate integrally formed in the cover case, the support plate dividing an interior space of the cover case into a first cavity facing the housing, and a second cavity remote from the housing;
 a plurality of brushes mounted in the first cavity of the cover case;
 a bearing mounted on the support plate; and
 a printed circuit board mounted in the second cavity of the cover case;
a connector integrally formed with the cover case and comprising a plurality of terminals respectively electrically connected with the printed circuit board and the brushes;
a Hall sensor mounted on the printed circuit board and combined with the ring magnet being used to detect a rotational speed of the rotor;
a further printed circuit board arranged perpendicular to the printed circuit board; and
a grounding capacitor mounted on the further printed circuit board and connecting one of the terminals directly to the housing.

2. The motor of claim 1, wherein the connector adjoins a radial outer periphery of the cover case, and the terminals extend into the cover case.

3. The motor of claim 1, wherein the terminals electrically connected with the printed circuit board are respectively soldered to contacts of the printed circuit board.

4. The motor of claim 1, wherein the a surface of the printed circuit board that the Hall sensor is mounted is arranged parallel to the axial direction of the motor.

5. The motor of claim 1, further comprising a positive temperature coefficient thermistor mounted in the first cavity of the cover case, wherein the plurality of brushes comprises a first brush and a second brush, and the PTC is electrically connected in series with the first brush.

6. The motor of claim 5, further comprising a first choke electrically connected with the first brush, and a second choke electrically connected with the second brush, the first and second chokes being disposed within the first cavity of the cover case.

7. The motor of claim 5, further comprising a capacitor mounted in the first cavity of the cover case, wherein the capacitor is electrically connected between the first brush and the second brush.

8. The motor of claim 1, further comprising a grounding terminal, one end of the grounding terminal extending into the connector and electrically connected with one of the plurality of terminals, an opposite end of the grounding terminal sandwiched between the cover case and the housing and electrically connected to the housing.

\* \* \* \* \*